United States Patent [19]

Takahashi et al.

[11] Patent Number: 4,880,277

[45] Date of Patent: Nov. 14, 1989

[54] ON-VEHICLE AUXILIARY SEAT FOR INFANT

[75] Inventors: Takehiko Takahashi; Hideo Saito; Takashi Watanabe; Tomihiro Kaneko, all of Tokyo, Japan

[73] Assignee: Combi Co., Ltd., Tokyo, Japan

[21] Appl. No.: 252,305

[22] Filed: Oct. 3, 1988

[30] Foreign Application Priority Data

| Oct. 2, 1987 | [JP] | Japan | 62-151467[U] |
| Oct. 2, 1987 | [JP] | Japan | 62-151468[U] |
| Oct. 23, 1987 | [JP] | Japan | 62-162040[U] |
| Oct. 30, 1987 | [JP] | Japan | 62-166370[U] |

[51] Int. Cl.⁴ .................................................. B60R 21/00
[52] U.S. Cl. ....................................... 297/467; 297/484
[58] Field of Search ............... 297/467, 484, 250, 487, 297/488, 229, 218, DIG. 2, 216; 24/172, 200, 198, 308

[56] References Cited

U.S. PATENT DOCUMENTS

| 2,269,696 | 1/1942 | Shavlson | 24/308 X |
| 4,342,483 | 8/1982 | Takada | 297/484 X |
| 4,376,551 | 3/1983 | Cone | 297/484 X |
| 4,463,984 | 8/1984 | Molnar | 297/250 |
| 4,632,460 | 12/1986 | Meeker et al. | 297/467 |
| 4,762,369 | 8/1988 | Nicod | 297/484 |
| 4,776,635 | 10/1988 | Hallice | 297/DIG. 2 X |

FOREIGN PATENT DOCUMENTS 56-55066 12/1981 Japan .
57-2197 1/1982 Japan .

Primary Examiner—Kenneth J. Dorner
Assistant Examiner—José V. Chen
Attorney, Agent, or Firm—Sughrue, Mion, Zinn, Macpeak & Seas

[57] ABSTRACT

An infant auxiliary seat for a vehicle is disclosed which comprises an auxiliary seat body constituted by a combination of a seat floor and a seat back; a pair of infant-arresting belts previously set up between the seat back and the seat floor so as to be capable of retracting and projecting; and a belt-stop mechanism attached to a central portion of the front surface of the seat floor so as to be capable of being erected and prostrated. The pair of infant-arresting belts are provided to be freely fastened to the belt-stop mechanism at the respective longitudinally middle portions thereof.

15 Claims, 8 Drawing Sheets

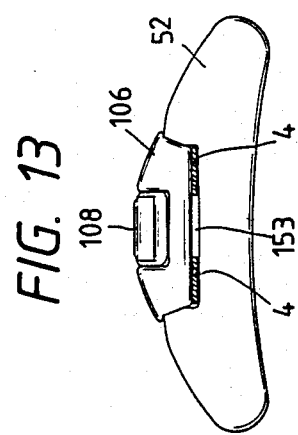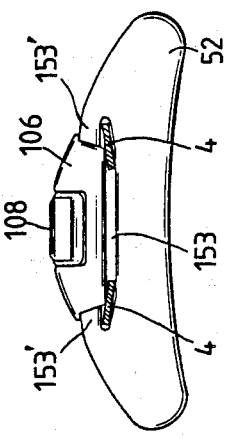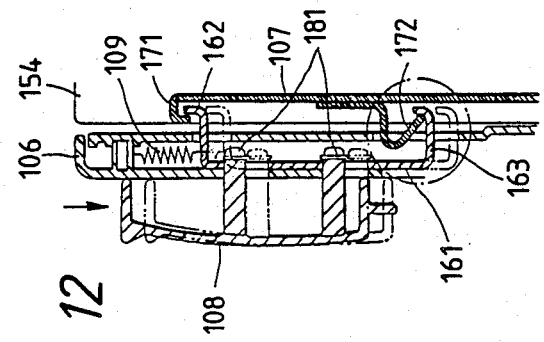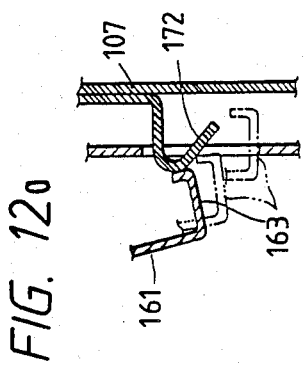

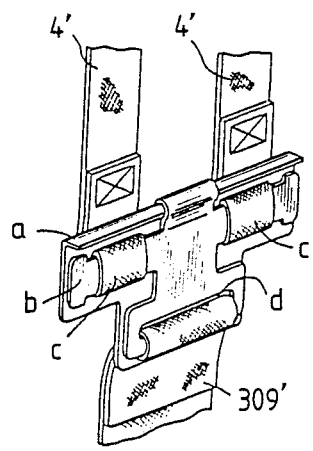
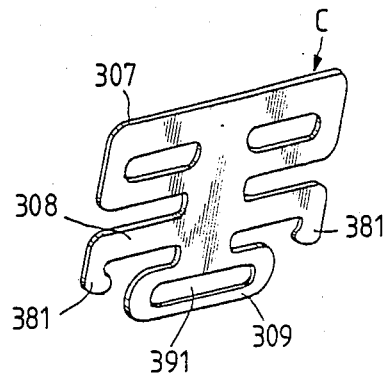
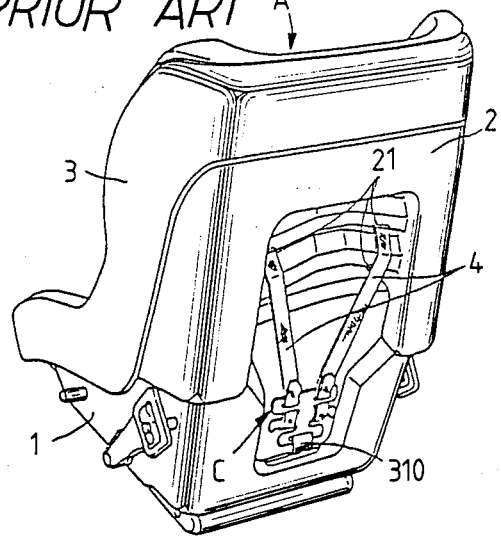
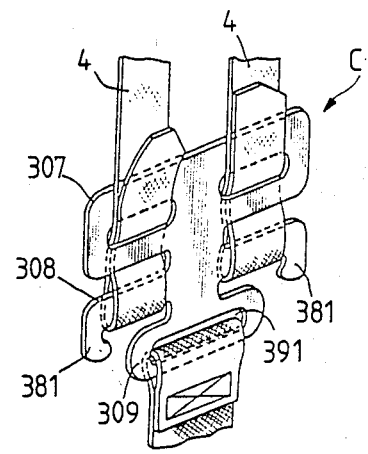

ON-VEHICLE AUXILIARY SEAT FOR INFANT

BACKGROUND OF THE INVENTION

The present invention relates to an auxiliary seat fitted to a vehicle seat and designed for an infant.

For an infant so young as to be unable to sit on a car seat for oneself, or an infant able to sit on a car seat for oneself but unable to cope with a jolt, a shock or the like, while the car is in motion, it is very risky to put such an infant on the car seat alone.

For the purpose of avoiding such a risk, generally, an infant auxiliary seat having a structure suitable for arresting the infant and which can be attached to a car seat has been used.

This type auxiliary seat is know commonly and generally called "(auxiliary) car seat" or the like.

For example, the structure of this type auxiliary seat is know from the teaching of Japanese Utility Model Post-Examination Publication No. 57-2197. The structure of the auxiliary seat disclosed in the Publication is as follows. Two belts for arresting an infant are drawn out from the seat back of an auxiliary seat body. Then the forward ends of the belts are collected at the upper end portion of a mechanism body forming a part of one buckle mechanism while the shoulders of the infant are pressed by the belts. Then the collected forward ends of the belts are fitted or fastened to another buckle mechanism in which the lower end of a buckle is attached to the seat floor. In short, the whole of the belt mechanism is formed as an integral fixed structure.

Accordingly, when used, the (two) belts of such a fixed structure including the buckle mechanism must be pulled over the head of the infant sitting in the auxiliary seat, so that the operation for attachment/detachment of the belts is very complex.

As described above, in the case of the aforementioned structure, the two belts for pressing the shoulders of the infant are designed to be collected to one buckle mechanism at the abdominal region of the infant. Accordingly, the fastening operation is apt to be made using the abdominal region of the infant. This is disadvantageous in that the operation is apt to bring an unpleasant feeling to the infant who is a user of the structure.

In the case of the aforementioned conventional structure, the buckle mechanism is attached to part of the belts. Accordingly, not only the manufacturing process of the structure is complex but also the parts used in structure. Accordingly, the manufacturing cost is apt to be high.

Further, the aforementioned conventional auxiliary seat is designed so that an infant is put on the auxiliary seat so as to face forward or backward with respect to the car seat and then fixed to the seat portion by use of seat belts incorporated in the car seat.

Not only it is a matter of course that the aforementioned auxiliary seat has a structure suitable for arresting the infant stably, but also it is required that the arresting force can be maintained without giving a large shock to the infant even in the case where the car stops suddenly in an emergency such as a crash accident or the like.

To satisfy these requirements, the conventional auxiliary seat has been designed as follows.

(1) Reinforcement ribs are provided in the rear surface of the auxiliary seat body to maintain the strength of the body and thus prevent the injury of the auxiliary seat body even in the case where a shock due to a crash or the like occurs.

(2) As described in Japanese Utility Model Post-Examination Publication No. 56-55066, a construction (rotary plate located in the pillow portion) for supporting or protecting the head of the infant is provided in the upper portion of the auxiliary seat body so that, in case of a car crash, the crash energy can be absorbed by the construction.

(3) Reinforcement pipes or the like are attached to the rear surface of the auxiliary seat. The seat belts of the car are passed through the reinforcement pipes to fix the auxiliary seat to the car seat, so that a shock due to a crash can be absorbed by the pipes.

However, the aforementioned conventional structures have the following disadvantages.

(1) In the case where a buffer or cushion member for supporting the head of the infant is provided in the upper part of the auxiliary seat body, only the head of the child is protected from the shock due to a crash or the like and, in particular, it is quite impossible to cope with the shock applied to the whole body of the infant.

(2) In the case where reinforcement ribs are integrally formed in the rear surface of the auxiliary seat body, the reinforcement ribs are exposed at the rear surface of the body an ugly appearance. Further, the exposed reinforcement ribs touch the car seat or the seat back portion thereof when the auxiliary seat is fixed to the car seat. As a result the cloth of the car seat is apt to be scraped or injured.

(3) In the case where pipes, serving as a shock absorber and as a reinforcement member, are mounted to the rear surface of the auxiliary seat body, the seat back is thickened because the size for mounting the pipes is added to the size of the auxiliary seat body. As a result the structure of the auxiliary seat becomes large in scale. Further, the pipes touch the car seat when the auxiliary seat is fixed to the car seat. Thus, the cloth of to the car seat is apt to be scraped or injured in the same manner as in the case of the reinforcement ribs.

Further, the infant put on the auxiliary seat is held in place by the two belts set up between the seat back and the seat floor of the auxiliary seat, so that the infant on the auxiliary seat is protected from a jolt of the car and a shock due to sudden stop or the like.

Further, the infant-arresting belts set up between the seat back and the seat floor can be taken up and drawn out by a retractor mechanism attached to the lower surface of the auxiliary seat body, so that the expansion and contraction of the belts can be made freely. In other words, the arresting belts are provided retractably so that the unpleasant feeling produced by applying the large tightening force of the arresting belts to the body of the infant can be eliminated at all times.

With respect to the infant-arresting belts, two belts are used for touching the front surface of the infant body and arresting the infant. The upper end portions (seat back side end portions) of the two belts are drawn out from the rear surface of the seat back and then taken up by the retractor attached to the lower surface of the seat floor. However, in the case where the two arresting belts are to be taken up by the rectractor as they are, the takeup mechanism of the retractor becomes large in scale, so that a large space is required for housing the belts. Furthermore, the necessary length of the belts becomes long. Consequently, there arises an economical problem on the whole.

Further, the position where the infant-arresting belts are drawn out from the seat back must be moved upward corresponding to the growing-up or size of the infant using the belts. To change the drawing-out position, the drawing-out position must be shifted from a lower-stage pair of slits to an upper-stage pair of slits, selected from the multiple stages of slits arranged in two rows in the seat back of the auxiliary seat. In the case of the conventional structure, the end portions of the infant-arresting belts are, however, taken up by the retractor as they are. Accordingly, in the case where the changing operation is to be performed, the belts taken up by the retractor must be removed from the retractor before the changing operation is carried out. As a consequence the changing operation is so complex that a housewife lacking in expert knowledge cannot operate the mechanism.

To cope with these problems, a structure has been proposed as follows.

As shown in FIG. 17, the end portions of the two arresting belts are collectively fastened to one belt-length adjusting member so as to be adjustable. Then another belt is drawn out from the lower end portion of the adjusting member so that one end of the belt is taken up by a retractor.

The structure of the adjusting member as shown in FIG. 17 is effective in reducing the size of the retractor mechanism and is economical in that the belts used are not long. However, the structure has still the following disadvantages.

(1) The adjusting member is composed of two parts; a fixing part a and a belt-stop part b. In the case where two infant-arresting belts 4', are fastened to the adjusting member, the operational procedure is complex because the adjusting member is used as follows. The forward ends of the belts 4' are respectively passed through from the rear sides of slits formed in the fixing part a so that the opposite ends of the belt-stop part b are inserted in loops c formed at the forward end portions of the belts.

(2) Because the end portions of the two belts 4', fastened to the adjusting member are fixed to the beltstop part b, it is impossible to use the part for the adjustment of the belt length. Therefore, the adjustment of the belt length cannot be made except by a method of adjusting the length of the other belt 309' drawn out toward the retractor through a series of belt-insertion slits d provided in the lower end portions of the fixing part a and belt-stop part b overlapping one another. As a consequence, the length of the two belts 4', directly touching the body of the infant cannot be adjusted finely.

(3) Because the end portion of the respective arresting belt 4' must be formed like a loop, a sewing process for forming such a loop is required thereby increasing the cost. Further, because the end portions of the respective belts 4' are formed like loops, the loop portions become thick, so that much labor is required for inserting the belt in the slits provided in the fixing part a.

(4) In the case where the loop portion of each belt 4' fastened to the belt-stop part b is to be removed, the belt 309' drawn out toward the retractor from the lower end of the adjusting member must be removed from the insertion slit d to cancel the overlapping of the fixing part a and belt-stoop part b before the belt-stop part b will be opened. Consequently, much labor is required for the removing operation which is very complex.

On such circumstances, the present invention is intended to cope with those difficulties.

SUMMARY OF THE INVENTION

It is therefore an object of the present invention to provide an infant auxiliary seat having very simple belt attachment/removal means without the necessity of pulling the infant-arresting belts over the head of the infant in use.

It is another object of the present invention to provide an infant auxiliary seat in a vehicle, in which necessary parts can be reduced in number.

It is a further object of the present invention to provide an infant auxiliary seat in which a cover for preventing the belts from floating up and out is provided for a belt-stop mechanism for fastening the middle portions of the arresting belts to thereby improve safety during the fastening of the belts.

It is a still further object of the present invention to provide an infant auxiliary seat in which the belts are not combined with any buckle mechanism to thereby simplify the total structure, and in which parts used in the belt-stop mechanism for fastening the middle portions of the belts are reduced in number to thereby reduce manufacturing cost.

It is also an object of the present invention to provide an infant auxiliary seat in a vehicle, in which a buffer or cushion member for supporting the body of the infant is integrally mounted to the inner side of the body of the auxiliary seat, by which the buffer or cushion member can absorb almost of shock energy in a case of emergency so that the shock given to the infant can be reduced.

It is another object of the present invention to provide an infant auxiliary seat in a vehicle, in which reinforcement ribs for reinforcing the auxiliary seat can be formed on the inside of the auxiliary seat body so as to be disposed opposite the buffer or cushion member to thereby attain a good appearance of the auxiliary seat including no exposure of the reinforcement ribs to the outside.

It is a further object of the present invention to provide a belt-length adjusting member in which the length of the infant-arresting belts attached to the auxiliary seat can be adjusted with ease and in which the structure of the belt-length adjusting member used for the adjustment of the belt-length is simple.

It is a still further object of the present invention to provide a belt-length adjusting member in which the operation of changing the position of beltinsertion slits provided in the seat back of the auxiliary seat can be made easily corresponding to the growing-up of the infant using the auxiliary seat.

In order to attain the above objects, according to an aspect of the present invention, the infant auxiliary seat comprises an auxiliary seat body composed of a seat floor and a seat back, a pair of infantarresting belts arranged to be previously set up between the seat back and the seat floor so as to be capable of being fed out and taken up, and a belt-stop mechanism attached to a central portion of the front surface of the seat floor so as to be capable of erection and prostration. The pair of infant-arresting belts are freely fastened to the belt-stop mechanism at the respective longitudinally middle portions thereof.

According to another aspect of the present invention, the infant auxiliary seat comprises an auxiliary seat body composed of a seat floor and a seat back, a pair of infant-arresting belts arranged to be previously set up between the seat back and the seat floor so as to be capable of being fed out and taken up, and a belt-stop mechanism attached to a central portion of the front surface of the seat floor so as to be capable of erection and prostration. The belt-stop mechanism has a stop groove for fastening freely the pair of belts at the respective longitudinally middle portions thereof, and a cover capable of opening and closing the stop groove.

According to a further aspect of the present invention, the auxiliary seat comprises an auxiliary seat body formed of rigid synthetic resin or the like. A seat floor and a seat back are combined so that the seat back is erected from the rear end of the seat floor. A shock-absorption interior plastic member having a buffer function, such as polystyrene resin foam or the like, is integrally attached to the auxiliary seat body so as to block the inside of the auxiliary seat body.

According to a still further aspect of the present invention, in the auxiliary seat, a belt-length adjusting member is formed by one metal plate having a suitable thickness, and includes: an upper portion which acts as a belt-insertion portion shaped like a figure of a turned-over "8", a cross-shaped stop bar arranged under the belt-insertion portion having its opposite ends crooked downward to form a pair of L-shaped portions, and a belt-stop ring arranged under the cross-shaped belt-stop bar having a belt-insertion hole formed in its center.

BRIEF DESCRIPTION OF THE DRAWINGS

Other features and advantages of the present invention will be apparent from the following description taken in connection with the accompanying drawings, wherein:

FIG. 1 is a perspective view showing a condition in use, FIG. 2 is a perspective view showing a modification in which belt turn-back notches are formed in a pad, FIG. 3 is a plan view showing a stop groove in the pad shown in FIG. 1, FIG. 4 is a plan view showing a modification of the stop groove in the pad shown in FIG. 3, FIG. 5 is a perspective view from the rear side, showing the condition of FIG. 1, FIG. 6 is a perspective view showing an example in which the auxiliary seat is attached to a car seat so that the infant can sit while facing forward, and FIG. 7 is a perspective view showing an example in which the auxiliary seat is attached to a car seat so that the infant can sit while facing backward (in the direction opposite to the driver);

FIGS. 8 through 14 are drawings showing another embodiment of the present invention, in which drawings FIG. 8 is a perspective view showing a condition in use, FIG. 9 is an enlarged perspective view of important parts in the condition that the cover attached to the pad is opened, FIG. 10 is an enlarged perspective view showing a modification of the pad depicted in FIG. 9 in which a belt folding-back groove is formed, FIG. 11 is a vertical sectional view of the pad shown in FIG. 8, FIG. 12 is a partly enlarged sectional view showing the condition of engagement of the stop plate with the fitting plate shown in FIG. 11, FIG. 12a is a blow up of the phantom lines in FIG. 12

FIG. 13 is a plan view showing the stop groove in the pad shown in FIG. 8, and

FIG. 14 is a plan view showing a modification of the stop groove in the pad shown in FIG. 13;

FIG. 15 is an exploded perspective view showing the condition in which a shock-absorption interior plastic member is attached only to the seat back, and FIG. 16 is a perspective view showing a modification of the shockabsorption interior plastic member;

FIG. 17 is an enlarged perspective view showing main part of a conventional adjusting member; and FIGS. 18 through 20 are drawings showing a still further embodiment of the present invention, in which drawings FIG. 18 is a perspective view of an adjusting member, FIG. 19 is a perspective view showing an example in which the adjusting member is used in the auxiliary seat, and FIG. 20 is an enlarged perspective view showing main part of FIG. 19.

DESCRIPTION OF THE PREFERRED EMBODIMENTS

Figure 1:
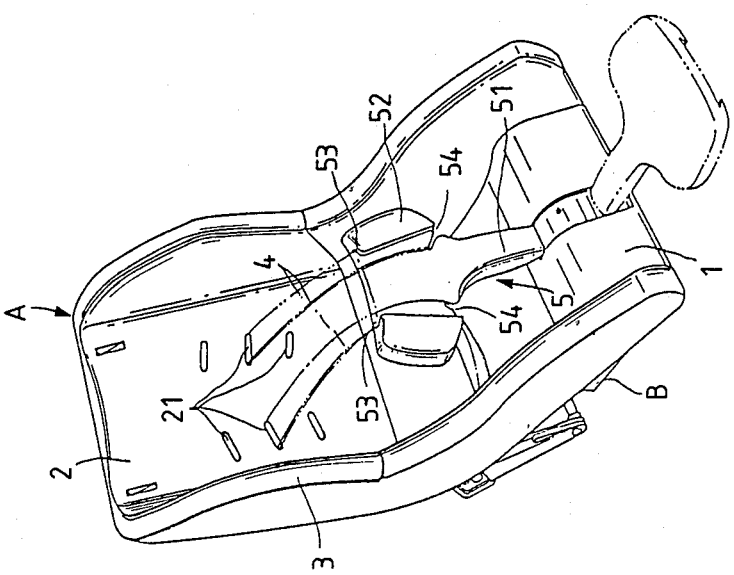
FIGS. 1 through 7 are drawings showing an embodiment of the present invention, in which drawings

Preferred embodiments of the present invention will be described in detail hereunder with reference to the drawings.

An auxiliary seat body generally designated by A is constituted by an auxiliary seat body composed of a seat floor 1 and a set back 2, each of which is made of rigid synthetic resin or the like, and an interior member 3 made of a cushion material such as a sponge sheet having suitable elasticity and arranged on the surface of the auxiliary seat body which an infant body will touch.

The construction of the aforementioned auxiliary seat body has been known and in the construction an inclination angle adjusting mechanism B is attached to the bottom of the auxiliary seat body A so that the height and inclination angle of the auxiliary seat can be adjusted as occasion demands.

The reference numeral 4, designates a pair of infant-arresting belts which are attached to the auxiliary seat body so as to extend between the seat back 2 and the seat floor 1. The infant-arresting belts 4, are retractable by a retractor mechanism (not shown) attached to the lower surface of the auxiliary seat body.

Several pairs of slits 21 are provided in the seat back 2 so that the infant-arresting belts 4 drawn out of a retractor (not shown) at the rear of the seat back 2 can be passed through any one pair of slits 21 from the rear to the front of the seat back 2 and attached to the opposite sides of the seat floor 1, respectively.

Although this embodiment shows the case where the pair of infant-arresting belts 4 are provided separately, the present invention is not limited to this, but applicable to the case where the pair of infantarresting belts 4 are replaced by a single longer belt which is arranged so that the forward end of the belt is drawn out toward one side of the seat floor 1 through one row of slits 21 formed in the seat back 2, passed through the lower surface of the seat floor 1 to be drawn out through the bottom of the seat floor 1, and drawn out to the rear surface of the seat back 2 through the other row of slits 21 where it is connected to the retractor (not shown).

In this embodiment, the retractor mechanism (not shown) is provided with an emergency lock mechanism (ELR mechanism) to be operated in a state of emergency such as a sudden stop.

The reference numeral 5 designates a belt-stop mechanism which is attached to the front surface of the seat floor 1 so as to be capable of erection and prostration.

The belt-stop mechanism 5 is composed of a shaft 51 capable of being erected and prostrated, and a wide pad 52 attached to the upper end of the shaft 51 to form the shape of in front view.

The pad 52 attached to the upper end of the shaft 51 is formed of rigid synthetic resin or the like and provided as a wide plate-like matter having a suitable thickness. A belt-stop groove 53 provided as a U-shaped groove having a predetermined width for the facility of fastening the respective meddle portions of the infantarresting belts 4 is longitudinally formed at the middle of the front surface of the pad 52.

Figure 3:
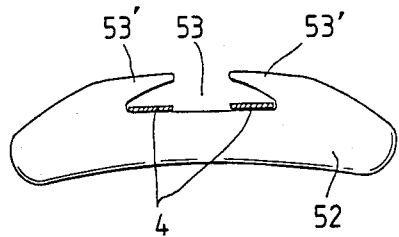
Figure 4:
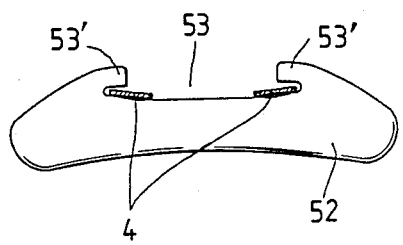
Figure 5:
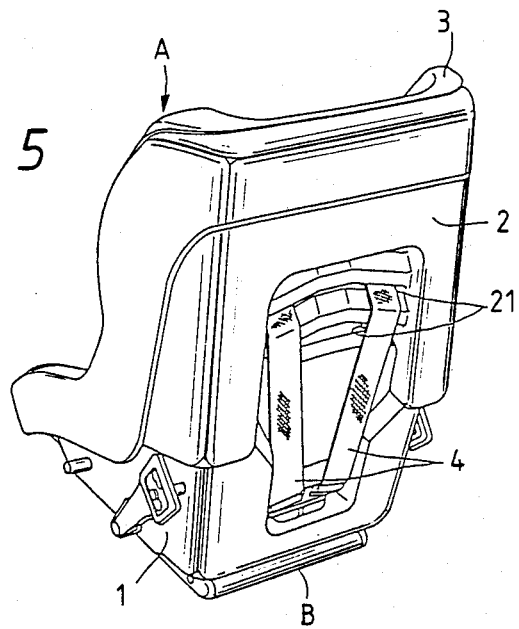
Figure 7:
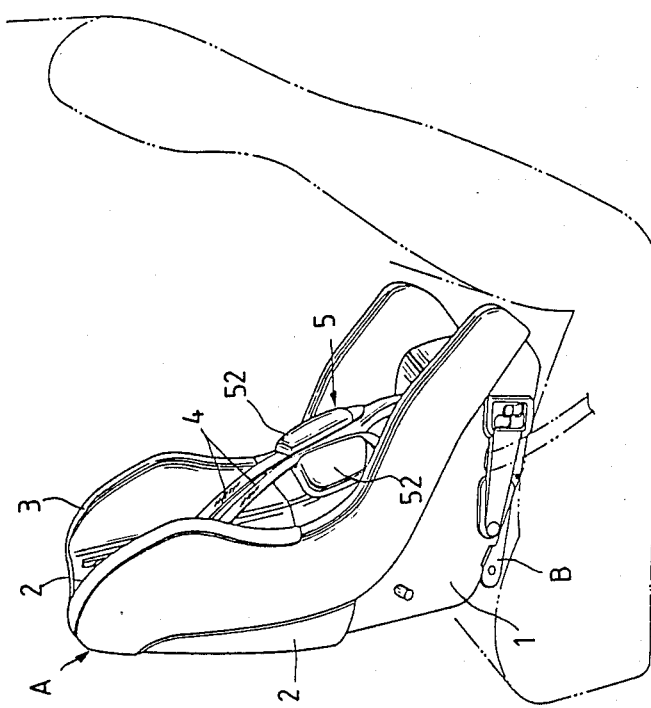
Figure 6:
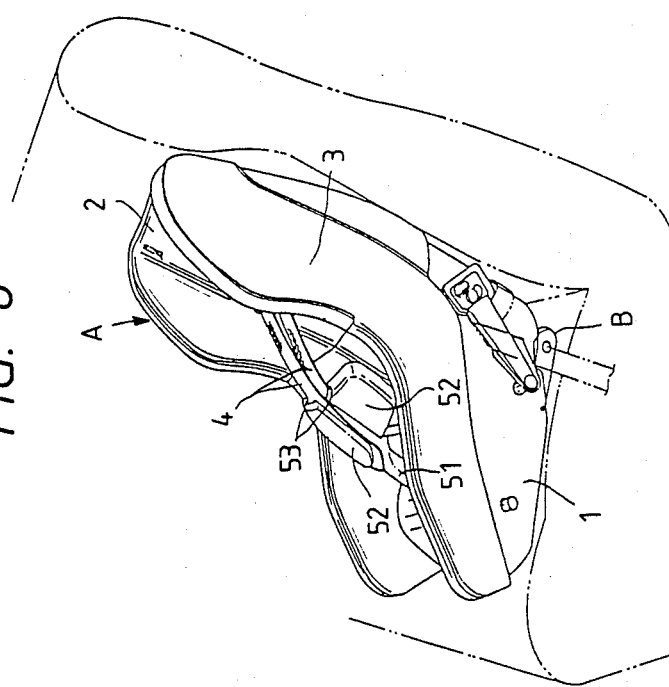

The shape of the belt-stop groove 53 provided in the front surface of the pad 52 is not specifically limited. To prevent the stop-state belts 4 from disconnecting suddenly from the belt-stop groove 53, the opposite ends of the groove 53 may be extended to the inside of the pad 52 to thereby form a pair of stop collars 53' so that the belt-stop groove 53 is C-shaped in sectional view as shown in FIGS. 3 and 4.

Figure 2:
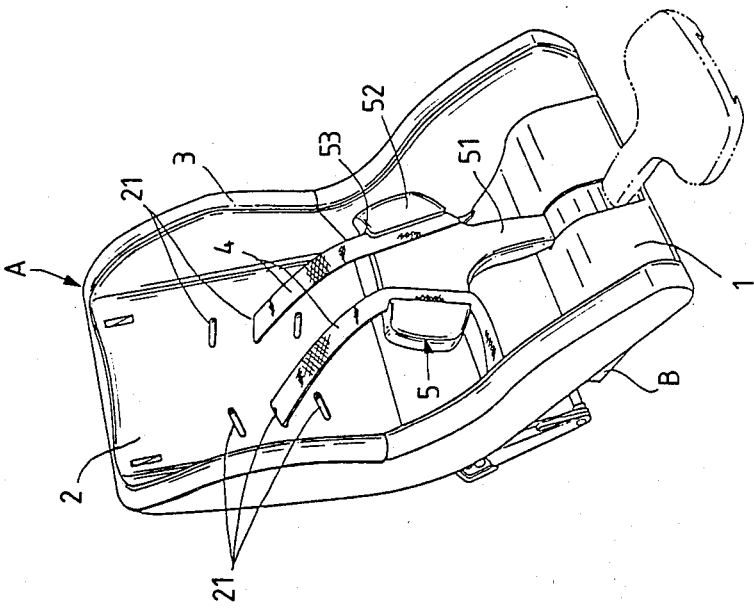

In principle, the belt-stop pad 52 is combined with the shaft 51 to form a T-shape in front view as shown in FIG. 1. The lower ends of the opposite sides of the pad 52 may however be slightly cut to the inside like the shape of an inverted V to form a pair of turn-back notches 54 as shown in FIG. 2, so that the infantarresting belts 4 can be turned back smoothly while in use to thereby make the infant comfortable without physical disorder.

The shaft 51 and the pad 52 as constituent members of the belt-stop mechanism 5 are reinforced with a metal plate inserted in the inside thereof and are totally coated with an elastic material such as sponge to give the infant a soft feeling in use.

The pad 52 may be formed of a synthetic resin material, such as formed synthetic resin having cushioning property.

The shaft 51 is pivoted at its lower end to the front portion of the seat floor 1. The angle of movement (erection and prostration) of the shaft 51 can be freely determined as occasion demands. In other words, the selection of the angle between erection and prostration of the shaft 51 can be adjusted so that the shaft 51 is erected to a contact position where the pad 52 touches the abdominal region of the infant, or so that the shaft 51 is erected somewhere short of the contact position.

Further, the belt-insertion slits 21 formed in the seat back 2 are arranged to provide comfort to the infant who is using the auxiliary seat. In short, the distance between an upper-side pair of slits is established to be slightly larger than the distance between a lower-side pair of slits.

Because the distance between the belt-insertion slits 21 is gradually increased as the position of the slits go upward, the belts can be adjusted corresponding to the shoulder length of the infant even in the case where the size of the infant increases (or in the case where the infant has grown up).

The thus arranged auxiliary seat according to the present invention has the following effects.

(1) Because the infant-arresting belts 4 are previously arranged between the seat back 2 and the seat floor 1 so as to be capable of being expanded and contracted (capable of being fed out and taken up), the auxiliary seat can be easily used operation consists of sitting an infant on the seat floor without having to remove the belts and drawing up the belts from both sides. Then the belts are put on the shoulders of the infant in the same manner as shoulder belts of a knapsack.

(2) The belts 4 put on the shoulders of the infant serve as two parallel lines to be in contact with the front of the infant. If the infant on the auxiliary seat moves excessively, the belts may be disconnected from the infant by moving them to both sides. To solve this problem, the longitudinally middle portion of the two arresting belts 4 are fastened to the belt-stop mechanism 5 which is provided in the front of the infant so as to be capable of erection and prostration. Accordingly, the two belts are pulled to the center at the front of the abdominal region of the infant, so that the belts can be kept in a stop state in which the belts are collected in the shape of H in front view. Consequently, the present invention has an excellent characteristic in that a full-harness stop state highest in safety can be obtained very easily.

(3) The connection of the infant-arresting belt 4 to the belt-stop mechanism 5 can be made by erecting the belt-stop mechanism 5 located in the front of the infant and pulling up the middle portions of the belts 4 to the belt-stop groove 53 formed in the middle of the pad 52. In this condition, there is no possibility of disconnection of the infantarresting belts from the belt-stop mechanism.

(4) The disconnection of the infant-arresting belts 4 from the belt-stop mechanism 5 can be made very easily by reversing the aforementioned operation. Accordingly, the operation of sitting the infant on the auxiliary seat and taking up the infant from the auxiliary seat can be simplified greatly compared with the conventional structure.

(5) Because the infant-arresting belts 4 are structurally separated from the belt-stop mechanism 5, it is needless to use a buckle in the position where the belts touch the abdominal region of the infant. Accordingly, no discomfort is experienced by the infant while in use.

(6) Because there is no such buckle mechanism as combined with the infant-arresting belts 4, 4, the conventionally necessary process of sewing such a buckle to the belts can be omitted completely and, at the same time, the belt-stop mechanism can be simplified in construction. Accordingly, parts used can be reduced in number to thereby attain a reduction of the manufacturing cost.

Next, another embodiment of the present invention will be described in detail with reference to FIGS. 8 through 13.

In this embodiment, a belt-stop mechanism 5 is composed of a shaft 51 pivoted at a base 151 of the seat floor so as to be capable of being erected and prostrated between the legs of the infant, and a wide pad 52 having a belt-stop groove 153 formed as a vertically elongated U-shaped groove in its surface and being combined with the shaft 51 to form a T-shape in front view. The belt-stop groove 153 formed in the surface of the pad 52 is provided with a cover 106 to prevent a pair of infant-arresting belts 4 from floating up from the groove and, accordingly, keep the belts in a stop state.

The shape of the belt-stop groove 153 longitudinally provided in the front surface of the pad is not limited specifically. For example, the belt-stop groove 153 may have a simple U-shape as shown in FIG. 13 or may have a shape in which the groove 153 is provided with a pair of flanges 153' formed by extending the end portions of the groove 153 slightly to the inside of the pad 52 as shown in FIG. 14 to thereby prevent the stop-state belts 4 from disconnecting from the groove.

Figure 9:
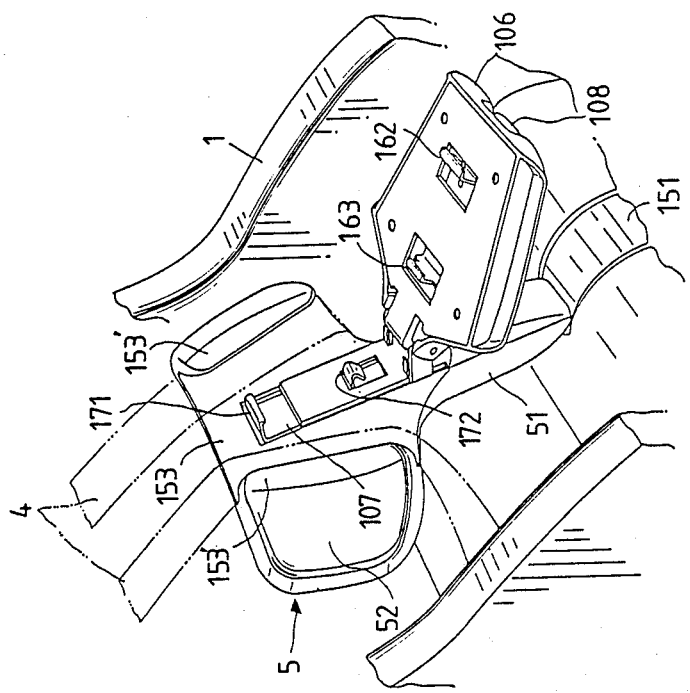
Figure 8:
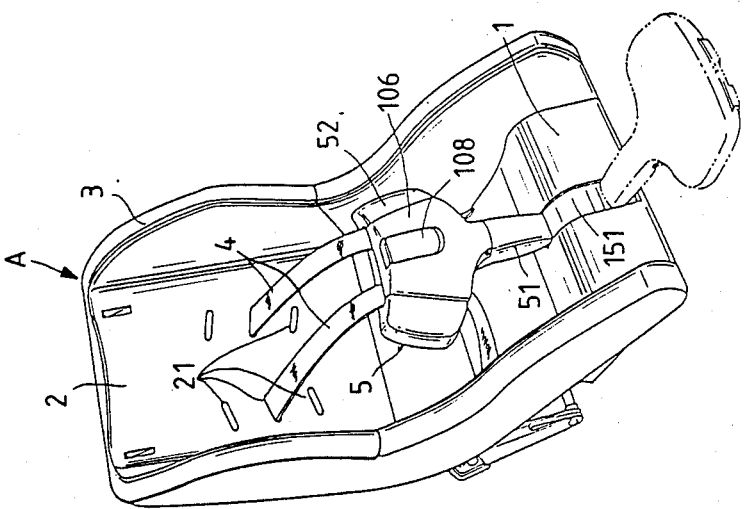
Figure 11:
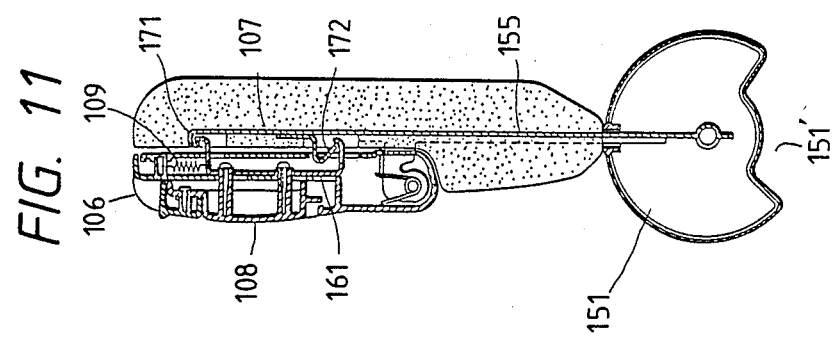
Figure 10:
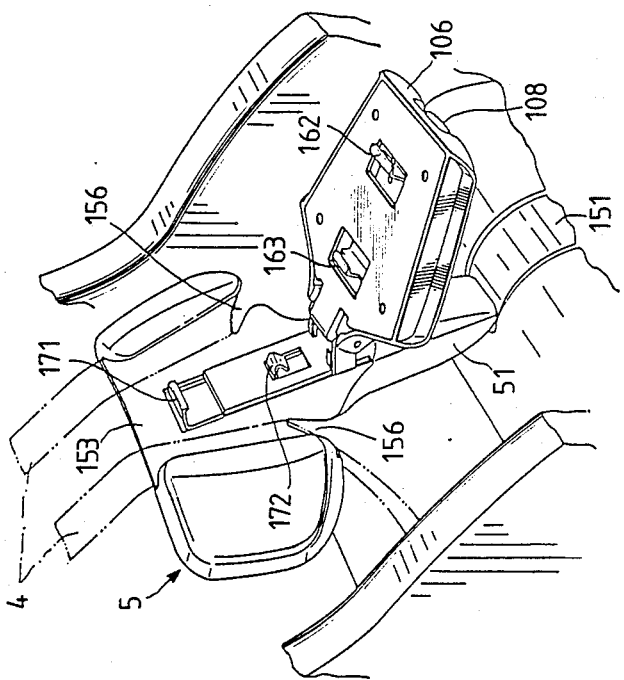

Although the groove 153 of the belt-stop pad 52 may be merely formed as a vertically elongate U-shaped groove as shown in FIG. 9, the opposite side of the lower end portion of the groove 153 (the opposite sides near the shaft 51) may be slightly cut like the shape of an inverted V to form a pair of turn-back notches 156, 156 as shown in FIG. 10.

The base 151 as arranged in the forward end portion of the seat floor 1 so as to be pivoted with respect to the seat floor 1. The wall of a cutaway portion 151' formed along the swinging direction in the lower end of the base 151 is engaged with a stopper (not shown) formed in the rear surface of the seat floor 1 to thereby limit the angle through which the belt-stop mechanism 5 may move.

The angle through which the belt-stop mechanism 5 moves can be freely determined as required.

In other words, the selection of the angle in erection of the shaft 51 can be adjusted so that the shaft 51 is erected to the contact position where the pad 54 touches the abdominal region of the infant or so that the shaft 51 is erected somewhere short of the contact position, or the selection of the angle in prostration of the belt-stop mechanism 5 can be determined based on the angle of the cutaway portion 151'.

The cover 106 arranged on the pad 52, so as to be capable of opening and closing, is provided with a stop plate 161 vertically movably attached to the inside thereof, so that the stop plate 161 can be engaged with and disengaged from a fitting plate 107 attached to the central portion of the stop groove 153.

The stop plate 161 vertically movably attached to the cover 106 is provided as an elongated plate having a pair of upward projecting L-shaped stop portions 162 and 163 formed at the upper and lower ends as shown in Fig. 12. The stop plate 161 is partly fixed to the rear surface of an opening-and-closing operation knob 108 slidably attached to the front side of the cover 106.

The reference numeral 181 designates screws for fixing the stop plate 161 to the rear surface of the opening-and-closing operation knob 108.

The reference numeral 109 designates a spring for pulling up the stop plate 161. The spring 109 always urges the stop plate 161 upward.

The fitting plate 107 attached to the central portion of the stop groove 153 is provided as an elongated plate 155 having a pair of stop hooks 171 and 172 formed at positions corresponding to the stop pieces 162 and 163 of the stop plate 161.

The upper stop hook 171 is provided as a reverses U-shape suitable for engagement with the stop portion 162 which is moved up.

The lower stop hook 172 to be engaged with the stop piece 163 is provided as an angle hook having a lower open end, so that, when the stop plate 161 vertically movably formed is moved down, the forward end of the stop piece 163 is engaged with the stop hook 172 to keep the stop state.

In particular, to give a so-called "self-entrance" structure to the stop piece 163 and the stop hook 172, and upward crooked portion is formed at the forward end of the stop portion 163 and, correspondingly, an inclined surface is formed at the stop hook 172 so that the crooked portion can be forcibly guided downward (refer to FIG. 12).

The belt-stop groove 153 is designed so that space enough to slide the infant-arresting belts 4 can be formed between the stop groove 153 and the rear surface of the cover 106 disposed thereon.

(1) Because the infant arresting belts 4, 4 can be shut in by means of the cover 106 from the outer side of the stop groove 153 after being engaged with the stop groove 153, the infant-arresting belts 4 fitted into the stop groove 153 so as to be slidable (retractable) can be perfectly prevented from floating up. Accordingly, the auxiliary seat according to the present invention is so high in safety that the belts 4 are never disconnected from the stop groove 153 even in the case where the infant moves excessively in use.

(2) Because the stop pieces 162 and 163 of the stop plate 161 vertically movably attached to the rear surface of the cover 106 and the stop hooks 171 and 172 of the fitting plate 107 attached to the pad 52 form a "self-entrance" structure, the closing of the cover can be made by the simple operation of placing the cover 106 on the stop groove 153 and without any specific engagement operation.

(3) When it is necessary to open the close-state cover 106, the cover 106 can be opened pushing down the opening-and-closing operation knob 108 vertically movably attached to the front surface of the cover 106 to thereby pull down the stop plate 161 interlocked thereto against the force of the spring 109.

(4) Safety in the stop state can be maintained by giving the spring 109 such elasticity that the stop plate 161 is urged upward by the force of the spring but cannot be pushed down by the force of the infant. Further, the urging force of the spring 109 can be cancelled easily by the force of the guardian of the infant.

(5) When it is necessary to remove the infant-arresting belts 4 the opening-and-closing operation knob 108 attached to the front surface of the cover 106 is pushed down in the direction of the arrow of FIG. 12 so that the stop plate 161 interlocked thereto is moved down.

As the stop plate 161 is moved down, the stop pieces 162 and 163 formed therein are moved down respectively to positions lower than the positions of engagement with the stop hooks 171 and 172, so that the engagement is released. Accordingly, in this condition the belts 4 can be removed by the simple operation of opening the cover 106.

(6) Because the cover 106 is pivoted to the front surface of the pad 52 so as to be capable of opening and closing, there arises no maintenance trouble such as the loss of the cover.

A further embodiment of the present invention will be described in detail with reference to FIGS. 15 and 16.

An auxiliary seat body designated by the symbol A is composed of a seat floor 1 made of rigid synthetic resin or the like, and a seat back 2 erected from the rear end thereof and combined therewith to form one body.

The reference numeral 221 designates reinforcement ribs which are integrally formed to be projected into the inside of the seat back 2 and seat floor 1 (along the surface on which an infant is seated). In the inside of the seat back 2, the ribs are projected at positions where the provision of slits 21 for insertion of infant-arresting belts 4 is not obstructed. In the inside (front side) of the seat floor 1, the ribs are integrally formed to be projected at positions where the swinging motion of erection and prostration of the stop mechanism for fastening the middle portions of the infant-arresting belts 4 is not obstructed.

The reference numeral 3 designates a shockabsorption interior molded member fitted into the seat back 2 and formed of a material having a suitable hardness, such as polystyrene foam, hard polyurethane foam, or the like.

It is preferably that the shock-absorption interior molded member 3 has reinforcement ribs (not shown) at its rear side in the same manner as those of the auxiliary seat body A.

The shock-absorption interior molded member 3 is formed on the inner surface of the auxiliary seat body A to attain the size enough to block the inner surface. The shock-absorption interior molded member 3 is united to the auxiliary seat body A by a suitable means. For example, the shock-absoprtion interior molded member 3 may be screwed to the auxiliary seat body A or may be stuck to it with an adhesive agent.

Figure 15:
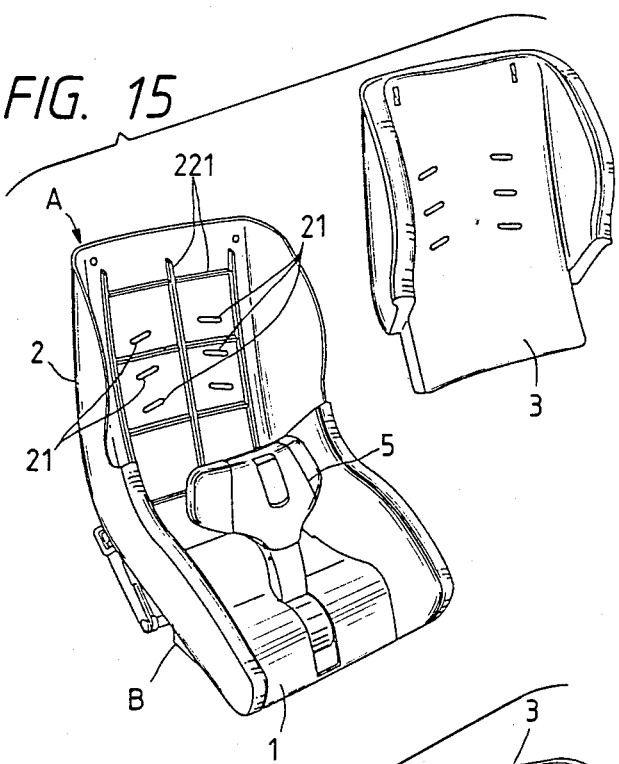
FIGS. 15 and 16 are drawings showing a further embodiment of the present invention, in which drawings
Figure 16:
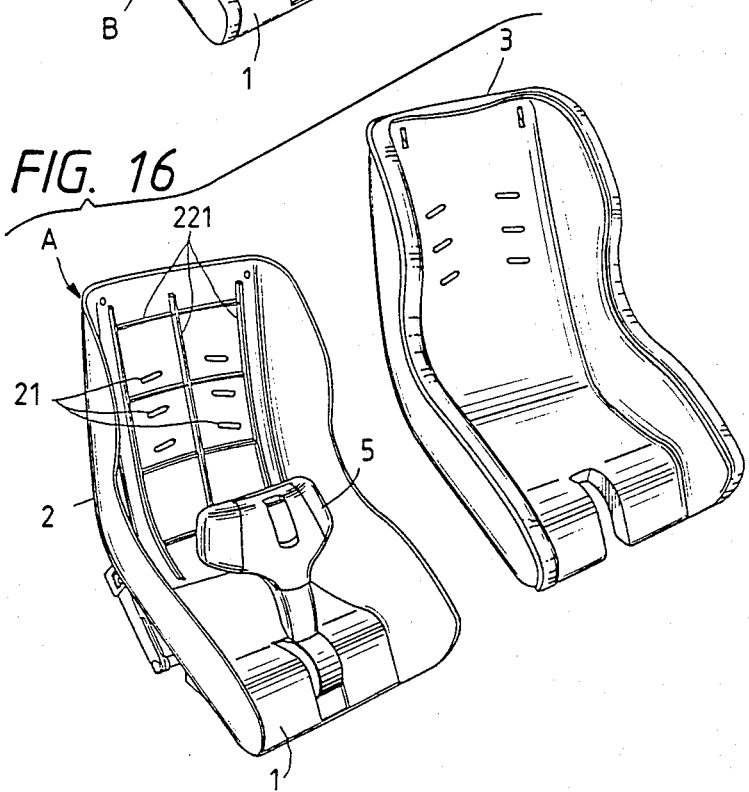

The shock-absorption interior molded member 3 may block the inner side of the seat back 2 of the auxiliary seat body A as shown in Fig. 15, or may block the whole inside of the auxiliary seat body A inclusive of the seat floor 1 as shown in Fig. 16.

The infant-arresting belts 4 are arranged between the seat back 2 and the seat floor 1. The belts can be partly taken up and drawn out by a retractor mechanism (not shown) attached to the lower surface of the body, thus to attain the expansion and contraction of the belts.

The thus arranged auxiliary seat according to the present invention has the following effects.

(1) The body of the infant put on the auxiliary seat 1 is always pressed toward the seat back by the force of inertia occurring during the running of the vehicle.

In general, in the case where a shock such as a crash arises, the body of the infant pressed against the seat back 2 is pressed out forward once by the shock and then is pressed against the seat back 2 more intensively by the rebound of the shock (which sometimes shows a value several times as much as gravity). In the present invention, the interior molded member 3 is integrally formed on the inner side of the auxiliary seat body A, so that the amplified shock can be absorbed by the interior molded member 3. Accordingly, the auxiliary seat according to the present invention has an advantage in that the body of the infant is kept free from such an intensive shock compared with the conventional auxiliary seat.

(2) In order to increase the strength of the auxiliary seat body A, the reinforcement ribs 221 must be formed on the whole of the construction. According to the present invention, the reinforcement ribs 221 can be formed on the surface (inner side) corresponding to the shock-absorption interior molded member 3.

Because the reinforcement ribs 221 are covered with the interior molded member 3 so that the projecting portion thereof is not exposed, the appearance of the auxiliary seat is good in design. Because, further, the reinforcement ribs 221 are not in direct contact with seat cloth of the car seat, the injury of the car seat caused by rubbing with the reinforcement ribs 221 can be prevented perfectly.

(3) Because the shock-absorption interior molded member 3 can be formed of an inexpensive material such as foam styrene or the like, the present invention has an advantage in that the cost of the product thus obtained is not increased and that the weight of the product is increased very little.

Next, a still further embodiment of the present invention will be described in detail with reference to FIGS. 18 through 20.

Similarly to the aforementioned embodiment, the auxiliary seat generally designated by the symbol A is includes an auxiliary seat body composed of a seat floor 1 and a seat back 2, each of which is made of rigid synthetic resin or the like, and an interior member 3 made of a cushion material such as a sponge sheet having suitable elasticity and arranged on the surface of the auxiliary seat body which an infant seat body will touch.

The reference numeral 4 designates a pair of infant-arresting belts which are drawn out of belt-insertion slits 21 arranged in two rows and in multi-stages in the seat back 2 and are provided so as to between the seat back 2 and the seat floor 1.

The upper end portions of the arresting belts 4 are wound up on a belt-length adjusting member C so as to be fastened at the rear surface of the seat back 2.

The belt-length adjusting member C is disposed between the infant-arresting belts 4 and the retractor mechanism (not shown) attached to the lower surface of the body. The belt-length adjusting member C is provided so that expansion and contraction of the infant-arresting belts 4 can be made freely by the taking-up or drawingout operation of the retractor mechanism (not shown).

The belt-length adjusting member C includes a metal plate of suitable thickness. More specifically, the belt-length adjusting member C has an upper portion provided as a belt-insertion portion 307 shaped like the figure of a turned-over "8" a crossshaped stop bar 308 arranged under the belt-insertion portion 307 which has its opposite ends crooked downward as pair of L-shaped stoppers 381 and a belt-stop ring 309 arranged under the cross-shaped belt-stop bar 308 having a belt-insertion hole 391 formed in its center.

In the drawing the reference numeral 310 designates a takeup belt set up between the length adjusting member C and the retractor (not shown). The upper end portion of the belt is fixed to the belt-stop ring 309.

The auxiliary seat according to the present invention is used as follows.

(1) Setting of Belt to Length-Adjusting Member:

In this case, the forward end portion of the infant-arresting belt 4 is folded in two by a predetermined length.

Then the twofold forward end portion of the belt 4 is inserted in the belt-insertion portion 21 from the front side and drawn out to the rear side by a predetermined length.

The twofold forward end portion of the belt 4 is drawn out to the rear side of the belt-insertion portion 307 by the aforementioned procedure, and is formed as a loop portion. The loop portion is fitted or fastened to the belt-stop bar 308 from the side.

After the twofold forward end portion of the belt is fastened to the belt-stop bar 308, the overlapping portion of the belt passed through the belt-insertion portion 307 is pulled up to tighten the belt 4 with respect to the belt-stop bar 308. Thus, the operation has been perfected completely.

In the case where the stop-state infantarresting belt 4 is to be removed from the length adjusting member C, on the contrary, the removal of the belt can be made by the simple operation of canceling the engagement between the stop bar 308 and the twofold forward end portion of the belt 4 to disconnect the loop portion from the stop bar 308.

(2) Adjustment of the length of Infant-arresting Belt:

(1) In the case where the length of the arresting belt is to be enlarged in accordance with the growing-up of the infant, the forward end portion of the belt 4 exposed at the side of the belt-insertion portion 307 is pressed toward the stop bar 8 to loosen the belt with respect to the stop bar 308.

In the condition that the belt 4 is loosened with respect to the stop bar 308, part of the belt 4 (overlapped at the rear side) continued on the seat back 2 side is pulled up so that the belt can be extended by a predetermined length with ease.

(2) In the case where the length of the infantarresting belt 4 is to be shortened, part of the belt continued on the seat back 2 side is pulled down contrarily to the case of the above item (1) to thereby loosen the belt with respect to the stop bar 308.

In the condition that the belt 4 is loosened with respect to the stop bar 308, the forward end portion of the belt at the insertion portion 21 is pulled up so that the belt 4 can be contracted with ease.

(3) The means for fastening the belt 4 to the adjusting member C is not limited to the aforementioned specific embodiment. For example, such fastening can be performed by inserting the forward end portion of the belt 4 in the belt-insertion portion 307 without folding into two, fastening the thus inserted forward end portion of the belt to the stop bar 308 while turning back it so as to be wound round the stop bar 308, and inserting again the thus fastened forward end portion of the belt 4 in the belt-insertion portion 307 from the rear side.

The method according to the above item (1) is superior to this from the view of simplicity of the operation.

The thus arranged auxiliary seat according to the present invention has the following effects.

(1) The conventionally known length-adjusting means employs the structure in which the forward end portion of the respective infant-arresting belt is formed like a fixed loop, and two adjusting members are used for fastening the forward end portion of the belt to the stop bars of the two adjusting members. In short, the conventional adjusting means is complex in construction. On the contrary, the present invention employs the structure in which only one length-adjusting member C is used. Accordingly, not only the process for pretreating the forward end portion of the infant-arresting belt can be omitted but also the means for fastening the belt to the adjusting member can be simplified.

(2) Because the length of each of the two infant-arresting belts can be adjusted finely and independently, a method of use corresponding to the body size of the infant can be attained.

(3) The function of the two arresting belts 4 can be asccomplished by simply passing the end portions of the belts through the length-adjusting member C while folding it into two. Further, the belts can be easily removed from the adjusting member C. Accordingly, the insertion position of the belt in the belt-insertion slits 21 formed in the seat back 2 of the auxiliary sead A can be easily changed corresponding to the growing-up of the infant. The defect of the conventional structure provided with troublesome means can be eliminated.

(4) Because the cross-shaped belt-stop bar 308 has its opposite sides crooked downward as the pair of Lshaped stoppers 381, 381, the twofold forward end portion of the belt fastened to the stop bar 307 is never unfastened laterally. Though the operation of fastening the twofold forward end portion of the belt may be simple, the same effect as that in the case where the belt is inserted into an insertion hole formed in a plate can be attained.

(5) In the case of the conventionally known adjusting means, two members are used in combination, so that the increase of cost is caused by the complexity in formation of the adjusting means. According to the present invention, on the contrary, the adjusting means can be formed by die-cutting one metal plate, so that the manufacturing process can be simplified to make it possible to provide the adjusting means at low cost.

(6) Because the infant-arresting belts 4 used in the present invention can have a length corresponding to the distance between the front surface of the auxiliary seat and the adjusting member C, the quantity of the belt in use can be reduced compared with the conventional structure, so that the manufacturing cost can be reduced

We claim:

1. An infant auxiliary seat in a vehicle comprising:
an auxiliary seat body having a seat floor and a seat back;
a pair of infant-arresting belts extending through said seat back, and having first ends attached to a retracting/projecting mechanism and second ends attached directly to said floor of said auxiliary seat body; and
a belt-stop mechanism pivotably attached to a central portion of a front surface of said seat floor so as to be capable of being erected and prostrated, said pair of infant-arresting belts being provided to be freely fastened to said belt-stop mechanism at respective longitudinally middle portions of said infant-arresting belts.

2. An infant auxiliary seat in a vehicle according to claim 1,
wherein said belt-stop mechanism comprises a shaft attached to a forward middle portion of said front surface of said seat floor, and a wide pad provided at an upper end of said shaft to form a T-shaped body.

3. An infant auxiliary seat in a vehicle according to claim 2, wherein said pad has a belt-stop groove of a predetermined width longitudinally formed on an outer middle portion of a front surface of said pad, said front surface facing away from an occupant of said seat.

4. An infant auxiliary seat in a vehicle comprising:
an auxiliary seat body having a seat floor and a seat back;
a pair of infant-arresting belts extending between said seat back and said seat floor so as to be capable of retracting and projecting; and
a belt-stop mechanism attached to a central portion of a front surface of said seat floor so as to be capable of being erected and prostrated, said pair of infant-arresting belts being provided to be freely fastened to said belt-stop mechanism at respective longitudinally middle portions of said infant-arresting belts,
wherein said belt-stop mechanism comprises a shaft attached to a forward middle portion of said front surface of said seat floor, and a wide pad provided at an upper end of said shaft to form a T-shaped body,
wherein said pad has a belt-stop groove of a predetermined width longitudinally formed at a middle portion of a front surface of said pad for fastening freely longitudinally middle portions of said pair of belts said front surface facing away from an occupant of said seat.

5. An infant auxiliary seat in a vehicle according to claim 4, wherein a cover is capable of opening and closing said stop groove.

6. An infant auxiliary seat in a vehicle according to claim 5, wherein said cover for closing said stop groove is arranged so that a closed state is maintained by fastening stop portions to stop hooks, said stop portions being formed so as to be projected from a stop plate attached to an inner side of said cover, said stop hooks being formed so as to be erected from a fitting plate attached to a middle portion of said stop groove, said stop portions and said stop hooks interlocking with each other so that said cover is maintained in said closed state.

7. An infant auxiliary seat as recited in claim 6, further comprising a spring disposed in said cover, said spring urging said stop portions of said stop plate into contact with said stop hooks.

8. An infant auxiliary seat in a vehicle according to claim 5, wherein a space enough to slide said infant-arresting belts is formed between said cover and said stop groove closed by said cover.

9. An infant auxiliary seat in a vehicle according to claim 4, wherein said stop groove has a C-shape in cross section.

10. An auxiliary seat in a vehicle according to claim 4, further comprising: an auxiliary seat body formed of rigid synthetic resin or the like and constituted by a combination of the seat floor and the seat back so that said seat back is erected from the rear end of said seat floor; and a shock-absorption interior molded member, such as polystyrene resin foam or the like, having a buffer function, said interior molded member being integrally attached to said auxiliary seat body so as to block an inside of said auxiliary seat body.

11. An auxiliary seat in a vehicle according to claim 10, wherein said shock-absorption interior molded member blocks only an inside of said seat back of said auxiliary seat body.

12. An auxiliary seat in a vehicle according to claim 10, wherein said shock-absorption interior molded member blocks an entire inner surface of said auxiliary seat body inclusive of an inside of said seat floor and an inside of said seat back.

13. An auxiliary seat in a vehicle according to claim 4, wherein said belts are retained by a metal member for adjusting lengths of said belts.

14. An auxiliary seat in a vehicle according to claim 13, said metal member comprising a single metal plate having a suitable thickness, said member having an upper belt-insertion portion having a pair of apertures disposed transverse to a central axis of said member, a cross-shaped belt-stop bar disposed under said belt-insertion portion relative to said central axis and extending transverse to said central axis, opposite ends of said stop-bar being turned downward to form a pair of L-shaped portions, and a belt-stop ring disposed under said cross-shaped belt-stop bar relative to said central axis, said belt stop ring having a belt-insertion hole formed therein.

15. An auxiliary seat in a vehicle according to claim 14, wherein said L-shaped portions formed at opposite ends of said cross-shaped belt-stop bar serve as stoppers for preventing disconnection of belts fastened thereto.

* * * * *